United States Patent [19]
Richard

[11] Patent Number: 5,934,146
[45] Date of Patent: Aug. 10, 1999

[54] DEVICE FOR CONTROLLING THE TRANSMISSION OF AN AUTOMOBILE

[75] Inventor: Olivier Richard, Choisy-le-Roy, France

[73] Assignees: Automobiles Peugot, Paris; Automobiles Citroen, Neuilly sur Seine, both of France

[21] Appl. No.: 09/037,001

[22] Filed: Mar. 9, 1998

[30] Foreign Application Priority Data

Mar. 13, 1997 [FR] France .................................. 97 03020

[51] Int. Cl.[6] .............................. F16H 59/04; G05G 9/10
[52] U.S. Cl. ................................... 74/473.33; 74/471 XY; 74/473.32
[58] Field of Search .......................... 74/471 XY, 473.31, 74/473.32, 473.33

[56] References Cited

U.S. PATENT DOCUMENTS

| | | | |
|---|---|---|---|
| 3,768,328 | 10/1973 | Campbell | 74/473.33 X |
| 4,027,547 | 6/1977 | Rahman et al. | 74/471 XY |
| 4,028,958 | 6/1977 | Schuermann et al. | 74/471 XY |
| 4,169,443 | 10/1979 | Todeschini | 74/471 XY X |
| 4,572,019 | 2/1986 | Suzuki | 74/471 XY |

FOREIGN PATENT DOCUMENTS 0 565 400 A1 10/1993 European Pat. Off. .
0 575 861 A1 12/1993 European Pat. Off. .

*Primary Examiner*—Allan D. Herrmann
*Attorney, Agent, or Firm*—Pollock, Vande Sande & Amernick

[57] ABSTRACT

A device for controlling the transmission of an automotive vehicle. A transmission cable (8) is connected to the end of an arm (15), beginning at which this component is actuated in a direction perpendicular to two orthogonal secant swivel pins (6, 7) by a return-motion lever (19) pivoting on a pin (20) lying in the same plane as the two secant pins (6, 7), in such a way that the transmission component (8) is placed at a desired distance spaced apart from the operating lever (5) and in proximity to the other transmission component (9). The invention is used in the automotive industry.

7 Claims, 2 Drawing Sheets

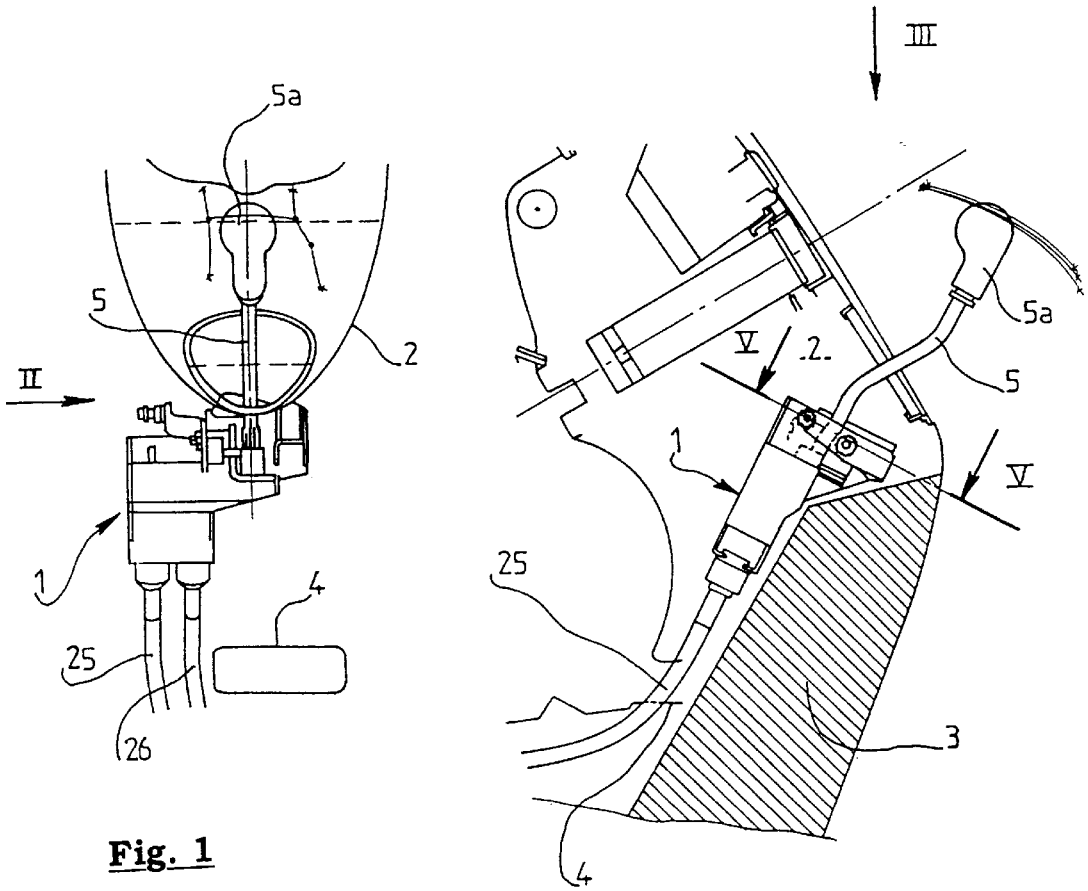
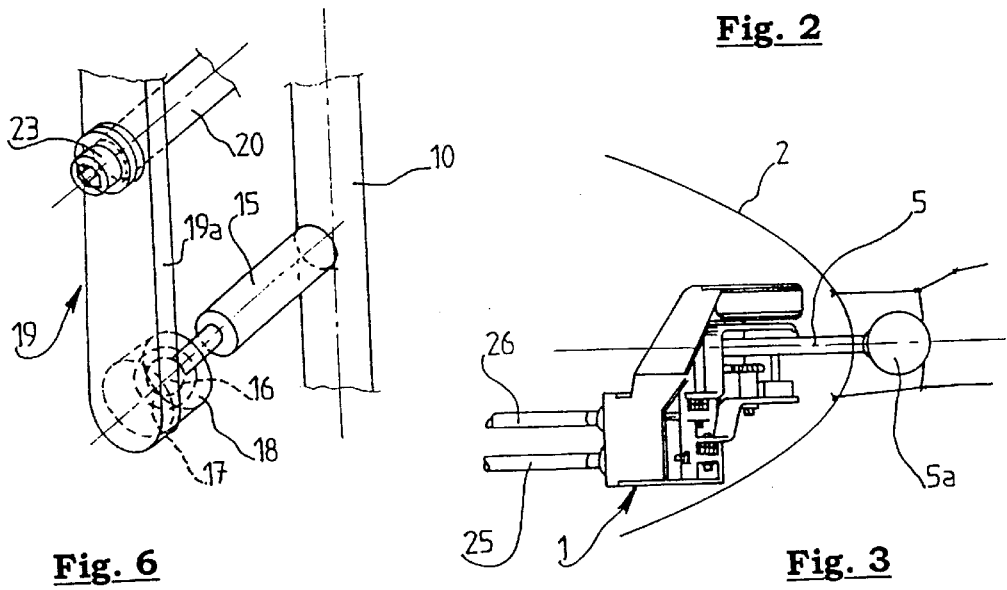
Fig. 1
Fig. 2
Fig. 6
Fig. 3

DEVICE FOR CONTROLLING THE TRANSMISSION OF AN AUTOMOBILE

FIELD OF THE INVENTION

The present invention concerns a device for controlling the transmission of an automotive vehicle.

BACKGROUND OF THE INVENTION

Transmission-control devices known to date have a structure such that it is difficult to obtain a storage space beneath the central part of the instrument panel, where such a device fills a relatively large area.

SUMMARY OF THE INVENTION

The present invention is intended to eliminate the aforementioned problem of conventional devices.

To this end, the invention proposes a device for controlling the transmission of an automotive vehicle, comprising an operating lever that can pivot on two secant, orthogonal pins so as to actuate two transmission components, such as two cables, in a direction substantially perpendicular to the two pins, beginning at two ends of two arms. Each of these ends in the middle position, is in proximity to one of the two pins and moved away from the other pin, such that the pivoting action of the operating lever around either of the two pins moves in that same direction the end of the arm, which is moved away therefrom and the associated transmission component, without causing displacement of the end of the other arm and of the other associated transmission components. At least one of the transmission components is connected to one of the arms, from which it is actuated by a return-motion lever pivoting on a pin falling approximately within the same plane as the two secant pins, so that this transmission component is positioned at a desired distance spaced apart from the operating lever and in proximity to the other transmission component.

Preferably, the return-motion lever is linked to the end of the associated arm by a joint exhibiting a freedom of movement parallel to each of the two secant pins.

The arm, linked by its end to the return-motion lever pivots, in conjunction with the operating lever, on one of the two pins which, in turn, pivots, in conjunction with the other arm, on the other pin borne by a support. To other arm incorporates an extension extending toward the front of the vehicle, the end of which is connected to the end of the corresponding transmission component. The return-motion lever linked to the end of the arm is also linked to the end of the other transmission component by means of an extension directed toward the front of the vehicle, the two ends joined to the extensions of the transmission components being in proximity to each other and falling, in the middle position, approximately within the plane containing the two secant pins.

Advantageously, the joint comprises a ball integral with the corresponding arm, on which is mounted a shoe element connected to the return-motion lever by means of a cap piece integral with the lever, in which the shoe element can move parallel to the swivel pin of the lever and radially in relation to this pin.

Preferably, the ball-support arm is, in the middle position, coaxial with the swivel pin of the other pivoting arm.

Each of the cables constituting the transmission components is connected to the corresponding extension of the return-motion lever and of the other arm by means of a connection piece.

The device according to the invention is incorporated into the vehicle instrument panel, and the operating lever is positioned in proximity to the longitudinal mid-plane thereof.

BRIEF DESCRIPTION OF THE DRAWINGS

The invention will be better understood and other goals, features, details, and advantages thereof will emerge with greater clarity in the following explanatory description provided with reference to the attached simplified and given solely as an example illustrating an embodiment of the invention, and in which:

FIG. 1 is a front view in perspective of the device according to the invention for control of the transmission of an automotive vehicle and installed in the instrument panel of this vehicle;

FIG. 2 is a side view of the device in FIG. 1 in the direction of arrow II;

FIG. 3 is a top view of the device in FIG. 2 in the direction of arrow III;

FIG. 6 is a partial perspective view in the direction of arrow VI in FIG. 5.

DESCRIPTION OF THE PREFERRED EMBODIMENT

Figures 4, 5:
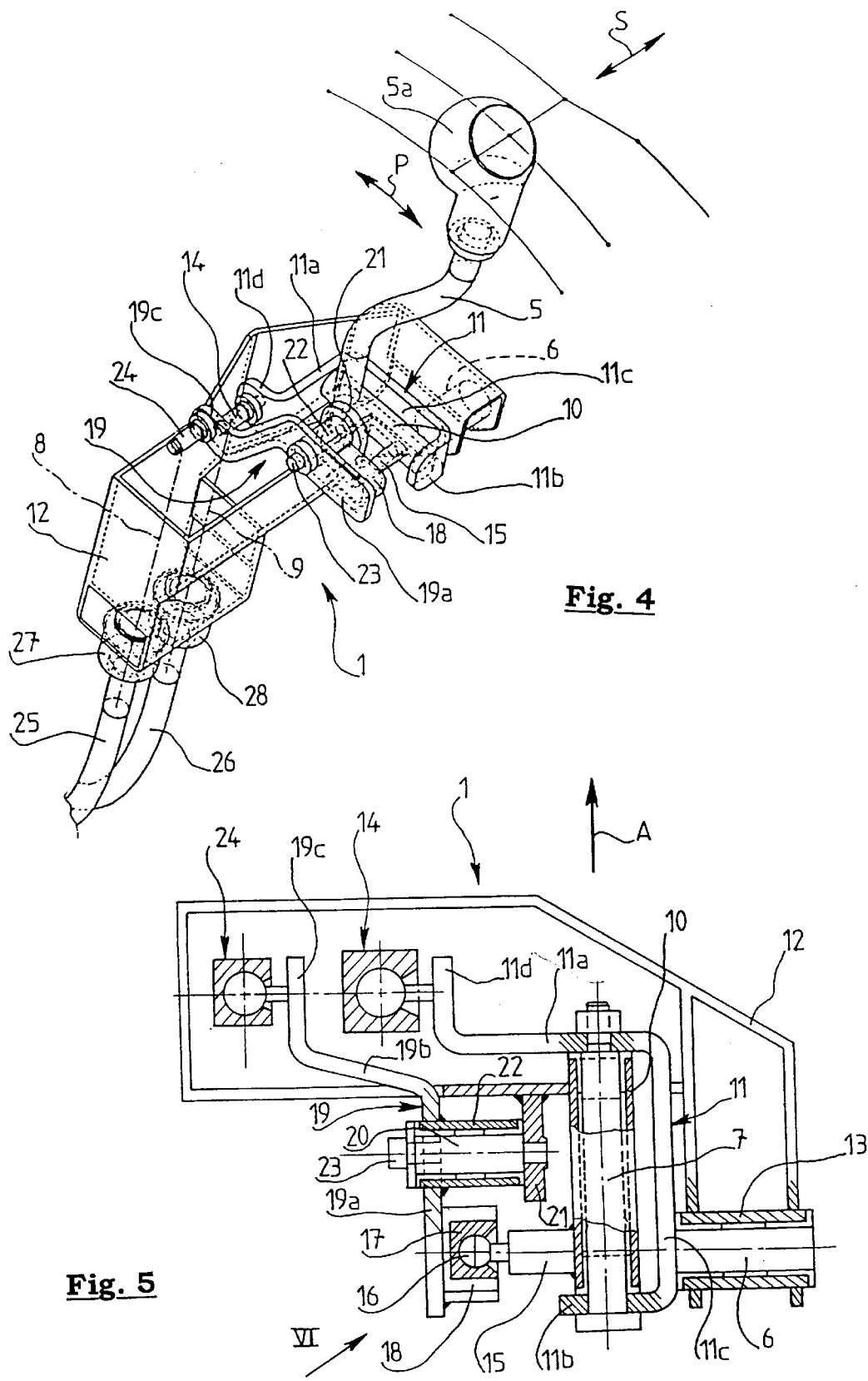
FIG. 4 is a perspective view of the control device according to the invention.
FIG. 5 is an enlarged cross-section along line V—V of the device in FIG. 2.

With special reference to FIGS. 1 to 3, reference 1 designates the device according to the invention, which makes it possible to control the transmission of an automotive vehicle.

This device is incorporated in the instrument panel 2 of the vehicle and is configured so as to provide a relatively large storage space 3 beneath the panel with a minimized volume of instrument panel 2, while allowing the outlet pipe 4 of the air conditioner (not shown) of the vehicle to open out in proximity to the longitudinal axis of this vehicle.

As shown more clearly in FIGS. 4 and 5, the control device according to the invention comprises a vehicle gearshift operating lever 5 positioned approximately in the longitudinal mid-plane of the vehicle and pivoting on two secant orthogonal pins 6, 7, the swivel pin 7 being parallel to the longitudinal axis of the vehicle, so as to actuate two gear-shift transmission components constituted, in the present instance, by two cables 8, 9 whose end pieces extend in a direction substantially parallel to the plane containing the two secant pins 6, 7.

At its end opposite the knob 5a of the operating lever, this lever 5 is mounted on the pin 7 by means of a sleeve 10 with which this end is made integral, this sleeve being mounted so as to rotate on the pin 7, which is immobilized between two arms 11a, 11b of a U-shaped part 11, one of these arms 11a constituting a pivoting arm which actuates one 9 of the transmission cables. As shown in FIG. 5, the pin 7 is constituted by a bolt fastened to the two arms 11a, 11b of the part 11 and transversely thereto. The part 11 is mounted so as to rotate in relation to the support housing 12 of the device by means of the pin 6 integral with the arm 11c linking the arms of the U 11a, 11b perpendicular thereto and mounted so as to rotate in a bearing 13 in the housing 12.

The arm 11a is extended transversely to the vehicle and ends in an extension piece bent at a right angle 11d, which extends toward the front A of the vehicle. A connection piece 14 belonging to the cable 9 is attached to the end of the extension piece 11d of the arm 11a.

A second arm 15 used to activate the cable 8 substantially perpendicularly to the plane containing the pins 6, 7 is fastened, for example welded, to one end of the sleeve 10 and perpendicularly thereto and opposite the pin 6 and coaxially with the latter. The arm 15, which is located on the arm 11b side of the part 11, comprises at its end a ball 16 forming a joint on which is fitted a shoe element 17 engaged in a cap piece 18 integral with one end of a straight section 19a of a return-motion lever 19 substantially parallel to the pin 7.

The straight section 19a of the return-motion lever 19 is mounted so as to pivot on a pin 20 fastened at one of its ends to a support bracket 21 attached, for example welded, to the body of the casing 12 parallel to the pin 7. Opposite the end of the pin 20 integral with the bracket 21, the straight section 19a of the return-motion lever 19 is mounted, for example by welding, to one end of a sleeve 22 mounted so as to rotate around the pin 20, and is held axially in position by a screw head 23 fastened to the pin 20, which falls approximately within the same plane as the two pins 6, 7. The return-motion lever 19 comprises an oblique section 19b continued by an extension piece 19c which extends toward the front of the vehicle, parallel to the extension piece 11d of the arm 11a and in proximity to the latter. The connection piece 24 of the other transmission cable 8 is fastened to the end of the extension piece 19c of the return-motion lever 19.

The return-motion lever 19 is thus linked by the ball to the end of the arm 15, so as to provide freedom of radial and axial movement in relation to the swivel pin 20 of this lever.

The two transmission cables 8, 9, illustrated in dot-and-dash lines in FIG. 4, project outward from two sheaths 25, 26, respectively, whose ends are held conventionally in a stopped position against a corresponding wall section of the housing 12, by means of two sleeves 27, 28 fastened to the housing 12. The two connection pieces 14, 24 of the transmission cables 8, 9, which are in proximity to each other, are, in the middle position illustrated most notably in FIG. 4, located approximately at the level of the plane containing the two secant pins 6, 7.

The manner of operation of the control device according to the invention has already been shown by the foregoing description, and will now be explained.

When the operating lever 5 is displaced in a gear-selection S movement shown in FIG. 4, the motion of the lever causes the sleeve 10 and the arm 15 to pivot simultaneously around the pin 7, thus causing an approximately vertical movement of the ball 16 and, therefore, the pivoting motion of the return-motion lever 19 around the pin 20, with the result that the extension 19c of this lever, which is at a greater distance from the pin 7 than is the extension 11d of the arm 11a, actuates the transmission cable 8 in a direction substantially perpendicular to the two secant pins 6, 7. Of course, the pivoting of the operating lever 5 around the pin 7 does not cause movement of the arm 11a, so that the connection piece 14 belonging to the cable remains in its middle position.

When the lever 5 is moved in the direction P indicated in FIG. 4 and falling within a vertical plane parallel to the longitudinal mid-plane of the vehicle, in order to shift from one vehicle gear to another, the part 11 pivots on its swivel pin 6 in such a way that the extension 11d, which is at a greater distance from the pin 6 than from the pin 7, actuates the transmission cable 9 in a direction substantially perpendicular to the two secant pins 6, 7, without causing displacement of the extension 19c of the return-motion lever 19, since the arm 15, which is coaxial with the pin 6, causes the ball 16 to rotate around its axis of rotation without causing the return-motion lever 19 to pivot around the pin 20.

The control device according to the invention is thus configured so that it can be installed both to the right and to the left of the mid-plane of the vehicle in which the operating lever is located, the transmission cables being offset transversely to the vehicle, as illustrated in FIG. 1, without modifying the operating kinematics of this device. The device also makes it possible to offset the cables toward the front of the vehicle so as to create a free space beneath the operating lever, for example so that a storage container can be placed there, as illustrated in FIG. 2. In addition, the control device is configured so that there is no interaction between the selection and the gear-shift movements effected by the operating lever. Modification of this lever allows changing the appearance of the entire device without changing the position of the gear-shift lever knob (see FIG. 4).

All of the aforementioned advantages of the control device according to the invention are gained without increasing the cost of manufacture thereof.

What is claimed is:

1. A device for control of the transmission of an automotive vehicle, comprising an operating lever (5) which can pivot on two secant orthogonal pins (6; 7) so as to actuate two transmission components (8, 9) respectively, such as two cables, in a direction substantially perpendicular to the two pins (6, 7), starting at two ends of two arms (11a, 15), each of these ends being, in the middle position, in proximity to one of the two pins (6, 7) and spaced apart from the other pin, in such a way that the pivoting motion of the operating lever (5) around either of the two pins (6, 7) moves in said direction the end of the arm (11a; 15), which is spaced apart the refrom and the associated transmission component (8; 9), without causing movement of the end of the other arm (15; 11a) and of the other associated transmission component (9; 8), wherein at least one (8) of the two transmission components (8; 9) is connected to the end of one (15) of the arms (11a; 15), starting at which it is actuated by a return-motion lever (19) which pivots on a pin (20) located approximately within the same plane as the two secant pins (6, 7), in such a way that this transmission component (8) is located at a desired distance spaced apart from the operating lever and in proximity to the other transmission component (9).

2. The device according to claim 1, wherein the return-motion lever (19) is linked to the associated end of the arm (15) by a joint (16) possessing freedom of motion parallel to a swivel pin (20) of the lever and radially in relation to this pin.

3. The device according to claim 1, wherein the arm (15) linked by its end to the return-motion lever (19) pivots, in conjunction with the operating lever (5), on one of the two pins (6, 7), which, in turn, pivots in conjunction with the other arm (11a) on the other pin (6) borne by a support (12), the other arm (11a) comprising an extension (11d) extending to ward the front of the vehicle and at the end of which the end of the corresponding transmission component (9) is linked, and the return-motion lever (19) being linked, on the one hand, to the end of the arm (15) and, on the other, to the end of the other transmission component (8) by an extension (19c) extending toward the front of the vehicle, the two ends linked to the extensions (11d, 19c) of the transmission components (9, 8) being in proximity to each other and, in the middle position, falling approximately in the plane containing the two secant pins (6, 7).

4. The device according to claim 2, wherein the aforementioned joint comprises a ball (16) integral with the corresponding arm (15) on which is mounted a shoe element (17) linked to the return-motion lever (19) by means of a cap piece (18) integral with this lever, in which the shoe element (17) can move radially and axially in relation to the swivel pin (20) of the lever (19).

5. The device according to claim 4, wherein the arm (15) supporting the ball (16) is, in the middle position, coaxial to a swivel pin (6) of the other pivoting arm (11).

6. The device according to claims 3 to 5, wherein the aforementioned transmission components are cables (8, 9), each of which is connected to the corresponding extension (19c, 11d) of the return-motion lever (19) and of the other arm (11a) by means of a connection piece (14, 24).

7. The device according to claim 1, wherein said device in installed in the instrument panel (2) of the vehicle and the operating lever (5) is located in proximity to the longitudinal mid-plane of the vehicle.

* * * * *